(12) United States Patent
Thompson et al.

(10) Patent No.: US 7,204,241 B2
(45) Date of Patent: Apr. 17, 2007

(54) COMPRESSOR STAGE SEPARATION SYSTEM

(75) Inventors: Glenn Thompson, Palos Verdes Estates, CA (US); Zafar Hussain, Perrysburg, OH (US)

(73) Assignee: Honeywell International, Inc., Morristown, NJ (US)

( * ) Notice: Subject to any disclaimer, the term of this patent is extended or adjusted under 35 U.S.C. 154(b) by 340 days.

(21) Appl. No.: 10/930,451

(22) Filed: Aug. 30, 2004

(65) Prior Publication Data

US 2006/0045764 A1 Mar. 2, 2006

(51) Int. Cl.
*F02B 25/06* (2006.01)

(52) U.S. Cl. ................................ 123/572; 123/573

(58) Field of Classification Search ........ 123/572–574, 123/41.86
See application file for complete search history.

(56) References Cited

U.S. PATENT DOCUMENTS

| | | | |
|---|---|---|---|
| 3,754,538 A * | 8/1973 | Ephraim et al. ......... 123/41.86 |
| 3,834,156 A * | 9/1974 | Cutler et al. ............... 60/605.1 |
| 4,269,576 A | 5/1981 | Shibuya | |
| 4,724,807 A | 2/1988 | Walker | |
| 5,333,990 A | 8/1994 | Foerster et al. | |
| 5,499,616 A * | 3/1996 | Enright ....................... 123/572 |
| 6,123,061 A | 9/2000 | Baker et al. | |
| 6,196,207 B1 * | 3/2001 | Megas ......................... 123/572 |
| 6,691,687 B1 | 2/2004 | Liang et al. | |
| 2001/0047801 A1* | 12/2001 | Baeuerle et al. ............ 123/574 |
| 2001/0054418 A1* | 12/2001 | Burgess ...................... 123/572 |
| 2002/0046743 A1 | 4/2002 | Moren | |
| 2004/0065206 A1 | 4/2004 | Walker, Jr. | |

FOREIGN PATENT DOCUMENTS

DE 4212653 10/1992
WO WO0238248 A1 5/2002

* cited by examiner

*Primary Examiner*—Marguerite McMahon
(74) *Attorney, Agent, or Firm*—Chris James; Brian Pangrle (57) ABSTRACT

An exemplary separator for coupling to a compressor includes a separation region substantially defined by an outer wall, part of an inner wall and an intermediate wall and an open region substantially defined by the inner wall and the intermediate wall and adjacent an outlet in the inner wall wherein the outlet provides passage to an air inlet of the compressor. Various other exemplary methods, devices, systems, etc., are also disclosed.

19 Claims, 5 Drawing Sheets

COMPRESSOR STAGE SEPARATION SYSTEM

TECHNICAL FIELD

Subject matter disclosed herein relates generally to equipment and processes for separation of components from a gas stream wherein a processed gas stream flows to a centrifugal compressor of, for example, a turbocharger of an internal combustion engine.

BACKGROUND

Near future heavy duty diesel engine emissions regulations require engine crankcase closure as a measure to curb hydrocarbon emissions. Currently, on-highway engines vent uncontrolled crankcase emissions to the environment. The marketplace has identified the need for solutions to closing the crankcase. Solutions available today are "add on", i.e., air/oil separators, plumbing and adaptors must be incorporated to complete a closed crankcase system. Typically, the turbocharger compressor inlet is plumbed to accept the crankcase vapor. The efficiency of the vapor separation process and the introduction into the turbocharger inlet can, and has, had a negative effect on compressor performance. Various exemplary methods, devices, systems, etc., disclosed herein address such issues and/or other issues.

BRIEF DESCRIPTION OF THE DRAWINGS

A more complete understanding of the various methods, systems, arrangements, etc., described herein, and equivalents thereof, may be had by reference to the following detailed description when taken in conjunction with the accompanying drawings wherein.

DETAILED DESCRIPTION

Figure 1:
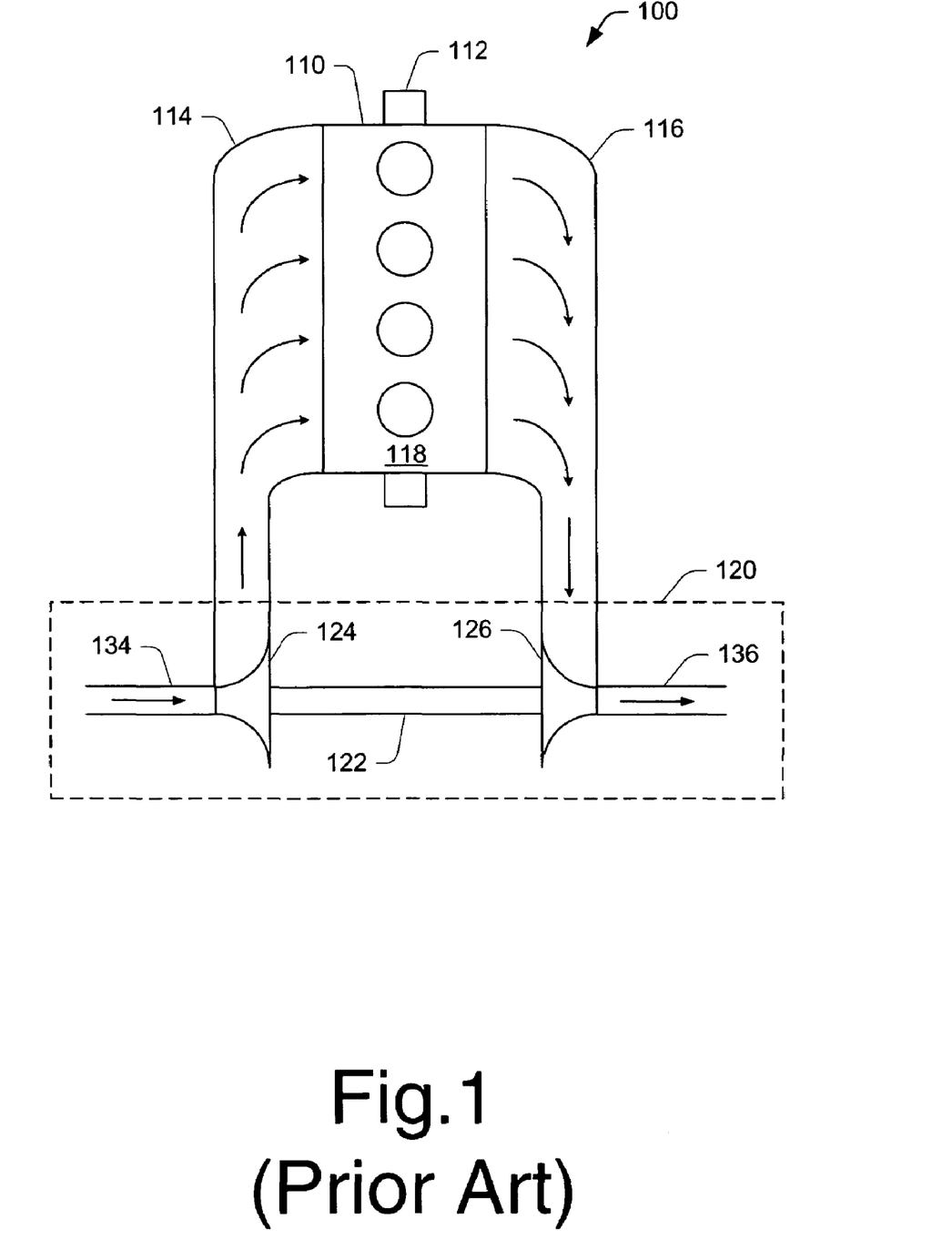
FIG. 1 is a simplified approximate diagram illustrating an exemplary system that includes a turbocharger and an internal combustion engine.

A brief discussion of a conventional turbocharger system for an internal combustion engine precedes discussion of various exemplary separators which are optionally suitable for use with such a system. FIG. 1 shows an exemplary system 100 that includes an internal combustion engine 110 and a turbocharger 120. The internal combustion engine 110 includes an engine block 118 housing one or more combustion chambers (e.g., cylinders, etc.) that operatively drive a shaft 112. As shown in FIG. 1, an intake port 114 provides a flow path for intake air to the engine block 118 while an exhaust port 116 provides a flow path for exhaust from the engine block 118.

The turbocharger 120 acts to extract energy from the exhaust and to use this energy to boost intake charge pressure (i.e., pressure of intake air, etc.). As shown in FIG. 1, the turbocharger 120 includes a shaft 122 having a compressor 124, a turbine 126, an intake 134, and an exhaust outlet 136. Exhaust from the engine 110 diverted to the turbine 126 causes the shaft 122 to rotate, which, in turn, rotates the compressor 124. When rotating, the compressor 124 energizes intake air to produces a "boost" in intake air pressure (measured in terms of force per unit area or energy per unit volume), which is commonly referred to as "boost pressure." In this manner, a turbocharger may help to provide a larger mass of intake air to the engine, which when mixed with an increased amount of fuel translates to greater engine output during combustion.

An exhaust turbine or turbocharger optionally includes a variable geometry mechanism or other mechanism to control flow of exhaust to the exhaust turbine. Commercially available variable geometry turbochargers (VGTs) include, but are not limited to, the GARRETT® VNT™ and AVNT™ turbochargers, which use multiple adjustable vanes to control the flow of exhaust through a nozzle and across a turbine. Further, the system 100 may include a turbocharger or compressor having an associated electric motor and/or generator and associated power electronics capable of accelerating and/or decelerating a shaft (e.g., compressor shaft, turbine shaft, etc.).

During operation of an internal combustion engine, some combustion gas may blow-by the pistons and enter the crankcase. Such "blow-by" gas typically include components such as hydrocarbons, NOx, oxygen, and lubricant (e.g., oil), which may be detrimental to engine components, the environment, lubricant longevity, etc. The composition of blow-by gas typically changes with changes in engine operating conditions. Consequently, the detrimental aspects of blow-by gas may be difficult to predict and control. Various exemplary separators disclosed herein aim to separate various components from blow-by gas and to circulate processed gas to the intake of an air compressor. Such separators can avoid direct venting of blow-by gas to the environment and optionally allow for formation of "closed" systems.

Figure 2:
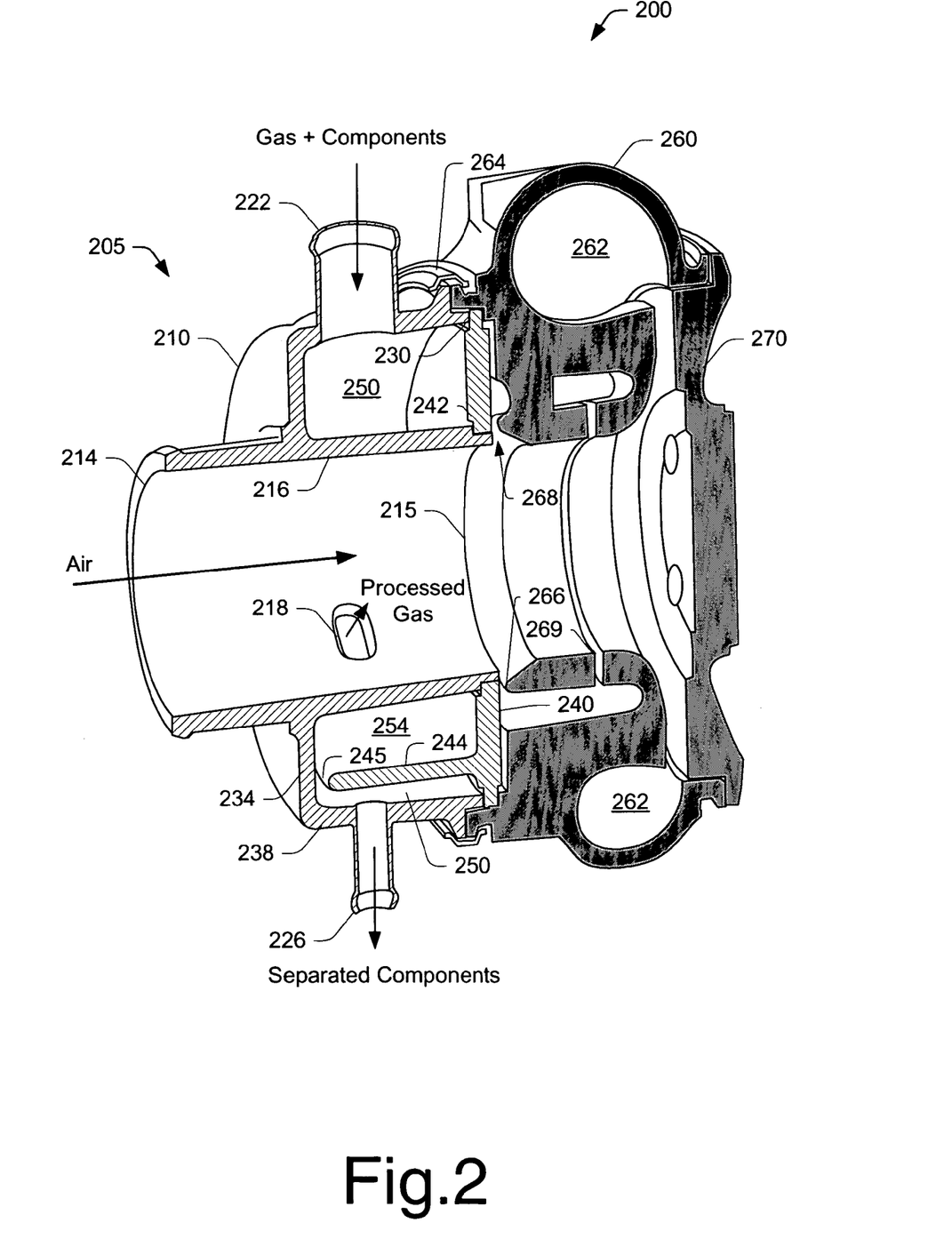
FIG. 2 is a cross-sectional, perspective view of an exemplary assembly that includes an exemplary separator.

FIG. 2 shows an exemplary assembly 200 that includes an exemplary separator 205. The exemplary separator 205 includes a shell 210 and an insert 240. In this example, the shell 210 and the insert 240 mount to a compressor housing 260, which, in turn, mounts to a plate 270. Further, a coupling mechanism 264 aids in coupling the separator 205 to the compressor housing 260.

In general, a compressor wheel is positioned in the compressor housing 260 along an axis of rotation wherein rotation of the compressor wheel drives air via an inlet 266 into a scroll 262 of the compressor housing 260. As discussed with respect to FIG. 1, various passages may direct the compressed air to combustion chambers or cylinders of an internal combustion engine.

The shell 210 includes an air inlet 214 and a gas and components inlet 222. The shell 210 also includes one or more processed gas outlets 218 and a separated components outlet 226. While the cross-section of FIG. 2 shows the inlet 222 and the outlet 226 at approximately 180° apart, other configurations are possible. However, the outlet 226 is preferably positioned with respect to gravity to facilitate flow of separated components, especially more dense separated components (e.g., lubricant, etc.).

In the exemplary separator 205 of FIG. 2, the processed gas outlet 218 appears as an orifice on a substantially cylindrical or tubular wall 216 of the shell 210. The cylindrical wall 216 directs air and the processed gas, if any, to the compressor housing 260. While the cross-section of FIG. 2 shows the outlet 218 at about 150° from the inlet 222, other configurations are possible. In yet other examples, more than one outlet may be present in the wall 216. In yet other examples, the insert 240 may include an axial extension that cooperates with part of the shell 210 or other element to form one or more processed gas outlets.

The exemplary shell 210 of FIG. 2 includes a substantially annular, disc-shaped wall 234 from which the substantially cylindrical tubular wall 216 extends axially outward and inward. At one end (e.g., an outward end), the wall 216 defines the air inlet 214 while at another end (e.g., an inward end) the wall 216 defines an outlet 215, for example, to the inlet 266 of the compressor housing 260. As described above, the wall 216 includes one or more outlets (e.g., the outlet 218) disposed at a radial position on the wall 216 and positioned between the inlet 214 and the outlet 215. The wall 216 also serves as an inner wall of the shell 210. The substantially annular, disc-shaped wall 234 meets another substantially tubular wall 238, which serves as an outer wall of the shell 210. The wall 238 extends axially to the edge or flange 230. In the example of FIG. 2, the inlet 222 and the outlet 226 are disposed on the wall 238 at positions about 180° apart. Other arrangements are possible, for example, wherein the walls 216 and 238 may have different shape or shapes (e.g., polygonal, elliptical, etc.).

In the exemplary separator 205, the insert 240 cooperates with the shell 210 to form two main regions: a separation region 250 and an open region 254. In this particular example, a wall 244 extends axially outward from a substantially annular, disc-shaped wall or base portion 242 of the insert 240. The wall 244 serves as an intermediate wall, intermediate the wall 216 and the wall 238. The wall 244 of the insert 240 and the wall 216 of the shell 210 substantially define the cross-sectional shape of the open region 254 and the separation region 250. As described further below in FIGS. 5 and 6, the wall 244 meets the inner wall 216 of the shell 210 to, in part, define the open region 254 and the separation region 250. In various examples, the wall 244 is a substantially arc section wall, for example, an arc section of a cylindrical wall, etc.

The wall 234 of the shell 210 (i.e., a compressor facing surface of the wall 234) and the wall 242 of the insert 240 define axial boundaries of the open region 254 and the separation region 250. The wall 244 of the insert 240 includes an end relief 245 that forms a passage with the wall 234. Thus, in the exemplary separator 205, the wall 244 extends axially toward the wall 234 except for the end relief 245, which allows for passage to the outlet 218. While one end relief 245 is shown, more than one such feature may exist. In this example and/or other examples, the wall 244 may include one or more openings in lieu of, or in addition to, the end relief 245. In general, the end relief acts to form an opening or passage to the open region 254. As shown in FIG. 2, the open region 254 coincides with the outlet 218.

Operation of the exemplary separator 205 typically relies on a depression generated by rotation of a compressor wheel housed in the housing 260. Such depression causes a low pressure at the outlet 218, which, in turn, causes flow of gas and entrained components into the inlet 266 of the compressor housing 260. In addition, flow of air from inlet 214 past the outlet 218 may also cause flow of gas and entrained components into the inlet 266 of the compressor housing 260. In general, flow through the outlet 226 occurs via gravity (e.g., a fluid drain) and mainly for more dense components of the inlet gas provided to the inlet 222.

The exemplary separator 205 of FIG. 2 is optionally coupled to an internal combustion engine wherein blow-by gas enters the separator 205 via the inlet 222 and dense components separated out of the blow-by gas by the separator 205 exit the separator 205 at the outlet 226. The dense components are optionally directed to a lubricant reservoir (e.g., an oil pan, a waste lubricant container, etc.).

The exemplary separator 205 of FIG. 2 may couple to a compressor and include a separation region substantially defined by the outer wall 238, part of the inner wall 216 and the intermediate wall 244 and an open region substantially defined by the inner wall 216 and the intermediate wall 244 and adjacent the outlet 218 in the inner wall 216 wherein an end relief 245 in the wall 244 and/or an opening in the wall 244 and the outlet 218 provides passage to an air inlet of the compressor. Such an exemplary separator optionally includes an outer wall 238 with a substantially tubular shape and optionally an inner wall 216 with a substantially tubular shape. Such an exemplary compressor optionally includes an intermediate wall 244 with an arc section of a substantially tubular shape.

The exemplary separator and compressor housing assembly 200 optionally includes a gap 268 between the base portion 242 of the insert 240 and the inlet 266 of the compressor housing 260. The gap 268 may act to reduce or suppress noise during operation of the compressor. Thus, the insert 240 as coupled to the compressor housing 260 acts to block noise emission from compressor air discharged in a reverse flow direction through a port 269 in a compressor wheel shroud portion of the compressor housing 260.

In general, a conventional ported compressor shroud typically includes a stamped metal wall pressed into the compressor housing inlet that prevents noise from escaping the inlet. Such reverse flow emission is audible in a manner that usually depends on the location of the turbocharger in the vehicle. Thus, as described herein, various exemplary separators optionally include a gap that acts to reduce noise associated with reverse flow and that optionally allows for management of compressor range.

As described herein, an exemplary assembly may include a compressor and a separator. For example, a compressor with an air inlet and a shroud where the shroud includes a port (i.e., a ported shroud) and a separator that couples to the compressor that includes a separation region for separating components of blow-by gas where a gap exists between the separator and the shroud that allows for air flowing outward through the port to be reintroduced to the air inlet of the compressor.

Figure 3:
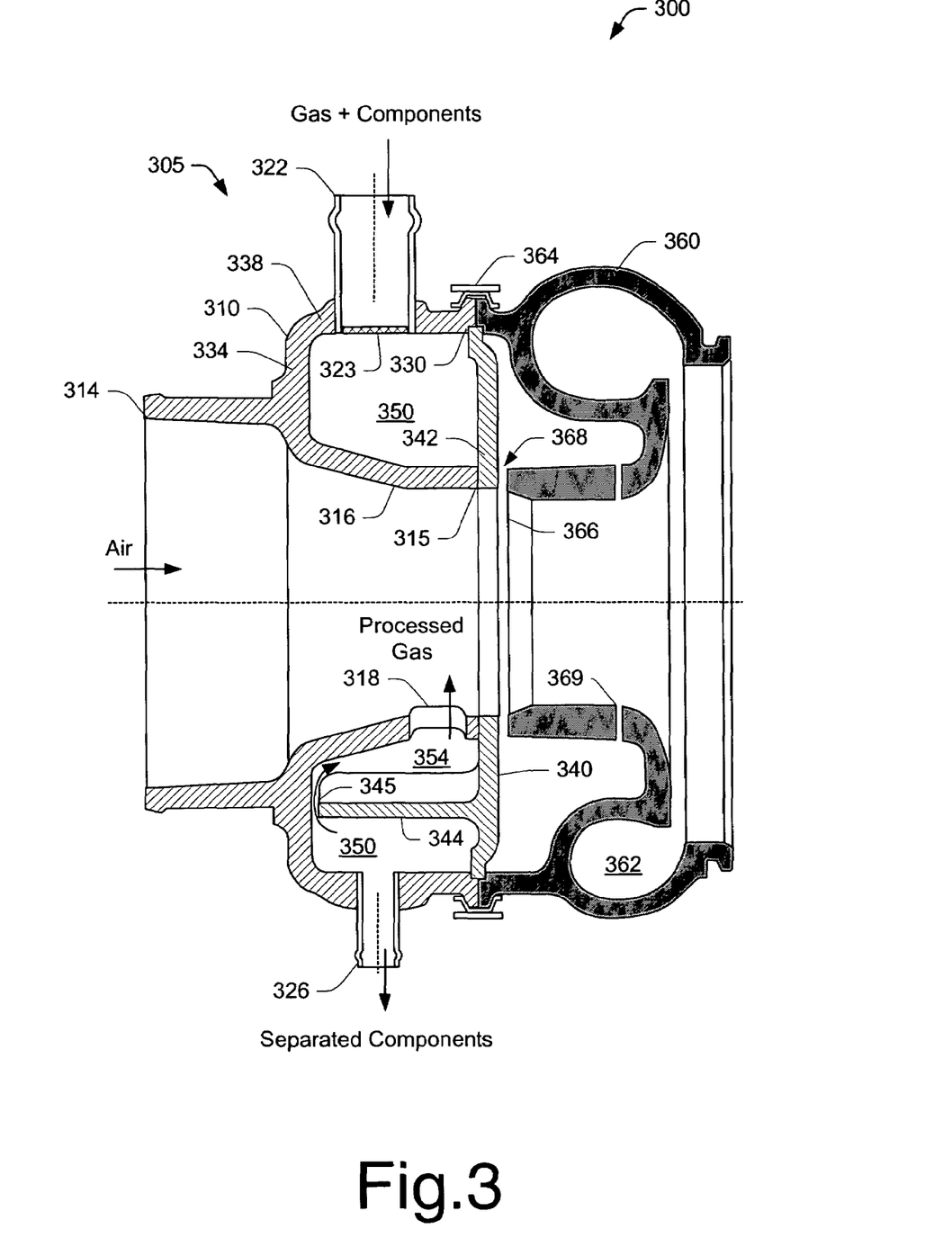
FIG. 3 is a cross-sectional view of an exemplary assembly that includes an exemplary separator.

FIG. 3 shows a cross-sectional view of an exemplary assembly 300 that includes an exemplary separator 305. The exemplary separator 305 includes various features of the exemplary separator 205 of FIG. 2. For example, the separator 305 includes a shell 310 and an insert 340 that act to define a separation region 350 and an open region 354. In particular, the insert 340 includes a wall 344 extending axially outward form a base portion or wall 342 of the insert 340 to form the open region 354 in conjunction with a wall 316 of the shell 310 wherein the wall 344 extends approximately perpendicular to the base portion of the insert 340 (e.g., at an angle of approximately 90° from the base portion of the insert 340). The wall 344 meets a surface of a wall 334 (e.g., a compressor facing surface) of the shell 310 except at an end relief 345, which forms a passage between region 350 and region 354.

In the example of FIG. 3, the wall 316 of the shell 310 includes an outlet 318 positioned approximately in-line with a gas and components inlet 322 and a separated components outlet 326. The inlet 322, the outlet 318 and the outlet 326 are optionally aligned with gravity. The inlet 322 optionally includes a filter, mesh, etc., 323 to prevent certain material from entering the separator 305.

In the exemplary shell 310 of FIG. 3 the wall 316 extends substantially axially outward and inward from the wall 334. At one end (e.g., an outward end), the wall 316 defines the air inlet 314 while at another end (e.g., an inward end), the wall 316 defines an outlet 315, for example, to a compressor. As described above, the wall 316 includes one or more outlets (e.g., the outlet 318) disposed at a radial position on the wall 316 and positioned between the inlet 314 and the outlet 315. The wall 316 also serves as an inner wall of the shell 310. The wall 334 meets another wall 338, which serves as an outer wall of the shell 310. The wall 338 extends axially to the edge or flange 330. In the example of FIG. 3, the inlet 322 and the outlet 326 are disposed on the wall 338 at positions about 180° apart. The wall 344 serves as an intermediate wall, between the wall 338 and the wall 316. In other examples, the wall 344 of the insert 340 is optionally disposed at one or more angles with respect to the base portion 342 of the insert 340.

In FIG. 3, the exemplary separator 305 couples to a compressor housing 360, for example, via a clamp 364. The compressor housing 360 includes a scroll 362, an inlet 366 (e.g., a bell mouth inlet, etc.), and a port 369 in a compressor wheel shroud portion of the compressor housing 360. A gap 368 exists between the inlet 366 of the compressor housing 360 and the base portion 342 of the insert 340. The gap 368 allows air flowing outward through the port 369 to be reintroduced into the compressor inlet 366. The gap 368 may also be used to reduce noise and/or manage compressor range.

Figure 4:
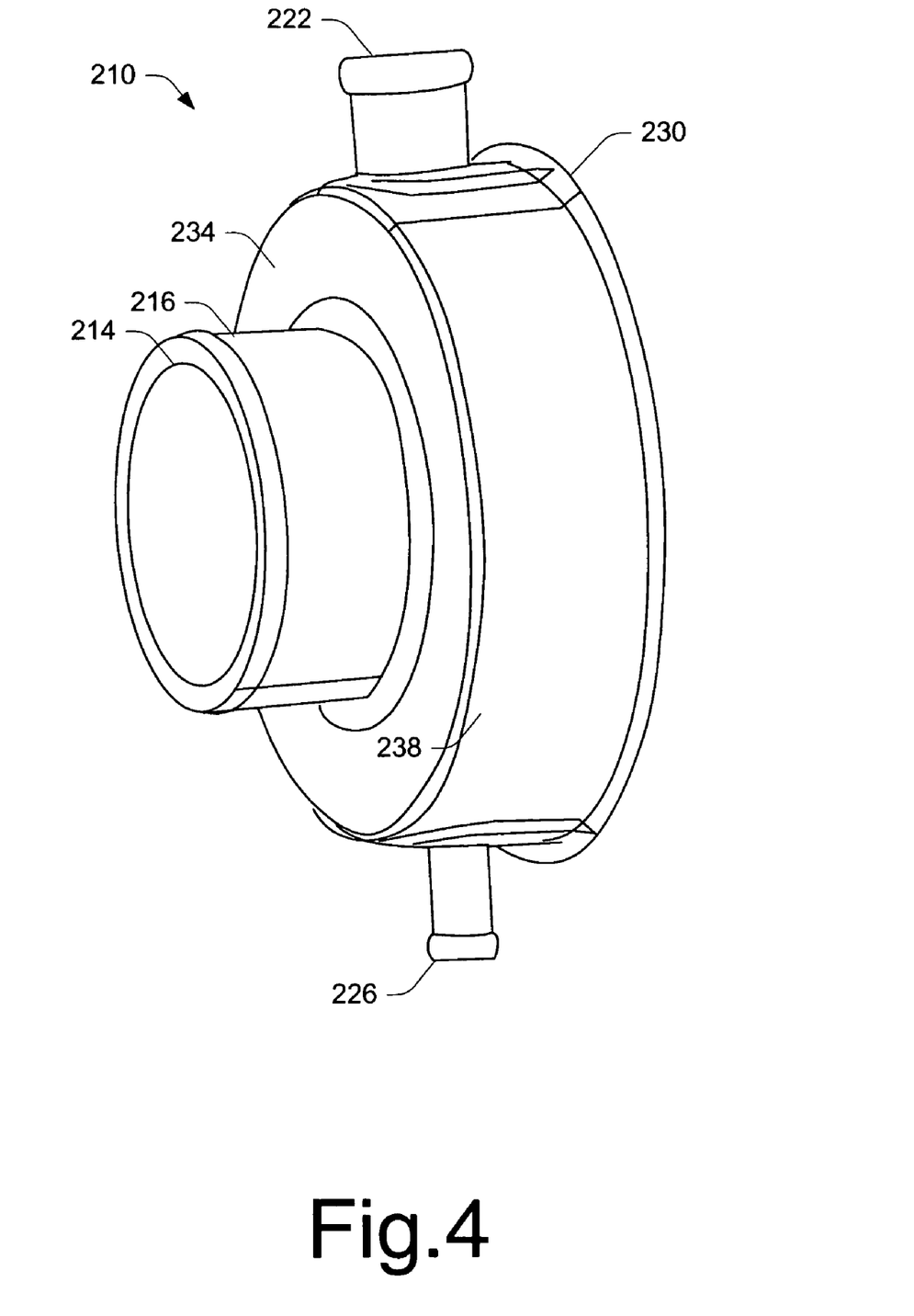
FIG. 4 is a perspective view of an exemplary shell for an exemplary separator.

FIG. 4 shows a perspective view of an exemplary shell 210 suitable for use in an exemplary separator (e.g., the separator 205 of FIG. 2, the separator 305 of FIG. 3, etc.). The shell 210 includes an air inlet 214, a gas and components inlet 222 and an outlet 226 for various separated components (e.g., lubricant, etc.). The shell 210 includes an edge or flange 230 for coupling to another part. For example, the edge 230 of the shell 210 may couple to a compressor housing and/or an insert part that inserts at least partially into a space defined by the shell 210. The exemplary shell 210 of FIG. 4 further includes a substantially annular, disc-shaped wall 234 from which a substantially tubular wall 216 extends axially outward and inward. At one end (e.g., an outward end), the wall 216 defines the air inlet 214 while at another end (e.g., an inward end), the wall 216 defines an outlet, for example, to a compressor (see, e.g., the outlet 215 of FIG. 2). As described elsewhere herein, the wall 216 includes one or more outlets (see, e.g., the outlet 218 of FIG. 2) disposed at a radial position on the wall 216 and positioned between the inlet 214 and the outlet, for example, to a compressor. The wall 216 also serves as an inner wall of the shell 210. The annular wall 234 meets another substantially tubular wall 238, which serves as an outer wall of the shell 210. The wall 238 extends axially to the edge or flange 230. In the example of FIG. 4, the inlet 222 and the outlet 226 are disposed on the wall 238 at positions about 180° apart.

In some instances, the wall 216 may be a separate part that couples to the wall 234 to thereby form an exemplary shell with an inner wall (e.g., the wall 216) and an outer wall (e.g., the wall 228). In other instances, an exemplary shell includes a wall such as the wall 216 that extends only inward from the wall 234 while still defining an air inlet (e.g., an inlet optionally flush with the wall 234, etc.). In such instances, a conduit or channel may couple to the shell to provide air.

Figure 5:
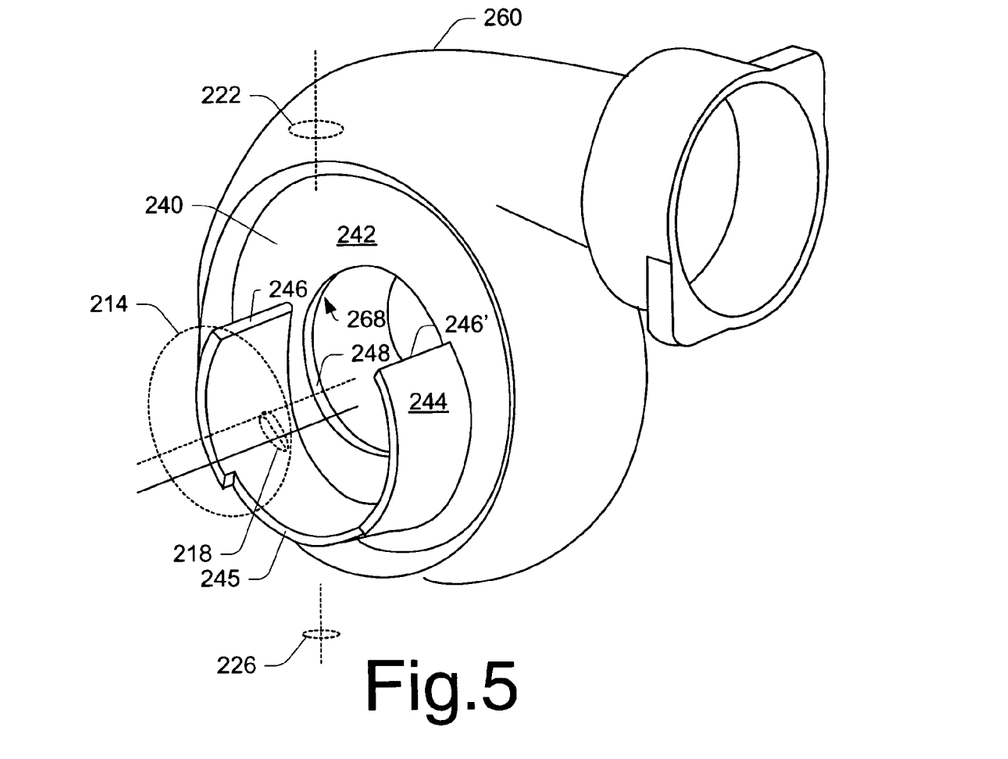
FIG. 5 is a perspective view of an exemplary insert coupled to a compressor housing.

FIG. 5 shows a perspective view of an exemplary insert 240 coupled to a compressor housing 260. As described further herein, a gap 268 exists between the insert 240 and an inlet of the compressor housing 260. Dashed lines indicate possible positions of inlets, outlets, and various axes of an associated shell. For example, the dashed line 214 indicates a position of a shell air inlet, dashed line 218 indicates a position of a processed gas outlet, dashed line 222 indicates a position of a gas and components inlet and dashed line 226 indicates a position of an outlet for various separated components. Of course, other arrangements are possible wherein the number and/or location of shell inlets, outlets and axes may differ from those shown in FIG. 5.

The exemplary insert 240 includes a wall 244 that extends from a base portion or wall 242 of the insert 240 and an opening 248 that leads to the compressor housing 260. The wall 244 of the example of FIG. 5 is substantially an arc section; thus, the wall 244 is a substantially arc section wall with arc edges 246, 246'.

The gap 268 exists proximate to the opening 248, between the wall 242 and an inlet to the compressor housing 260. In this example, the substantially cylindrical wall or annular wall 244 may be defined by an arc portion about a center or axis, represented by a solid line displaced from the dashed line associated with the air inlet 214 and/or the opening 248 of the base portion 242 of the insert 240. Thus, the focus of the wall 244 may be eccentric to the focus of the opening 248 of the insert 240 and/or the air inlet 214 of an associated shell. Further, the wall 244 may be defined in part by an eccentricity and/or be defined in part by more than one focus (e.g., eccentricity of an ellipse is greater than zero and less than one and includes two foci). In the example of FIG. 5, the wall 244 includes an end relief 245 that can form a passage to the outlet 218 in conjunction with part of a shell and/or another component. In other examples, the wall 244 may include one or more openings that form a passage to an outlet to a compressor air inlet stream. In such examples, the wall 244 may extend axially to a wall of a shell to define an open region and a separation region.

Another exemplary insert includes another wall that extends outward from the base portion 242 of the insert 240 proximate to the perimeter of the base portion 242. In such an example, an associated shell may include a central tubular section that directs intake air to a compressor and a surrounding annular plate portion or cap that couples to the outer wall of the insert 240. Thus, in this example, the term "insert" may pertain to a part that couples to a compressor housing wherein the term "shell" may pertain to a cover that cooperates with the insert to form an open region and a separation region.

Figure 6:
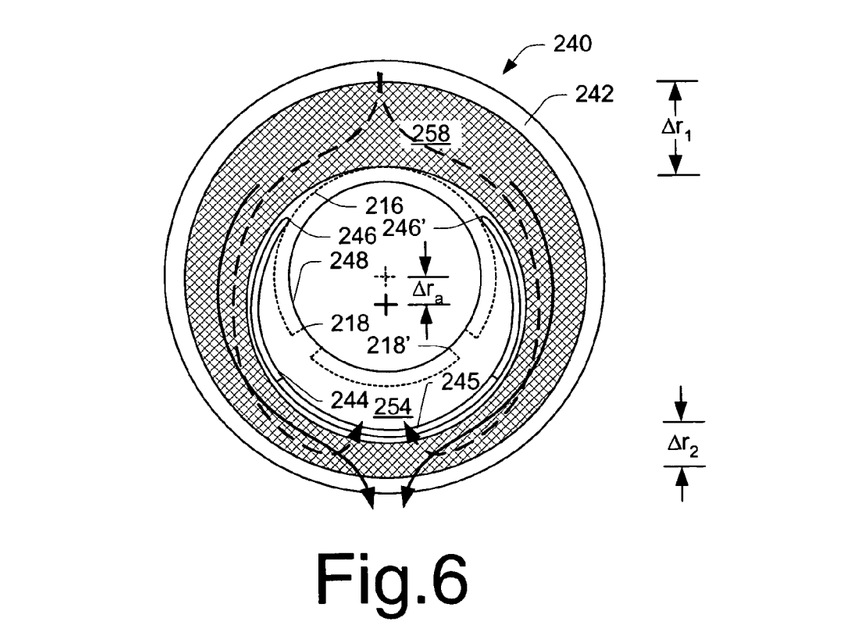
FIG. 6 is a top view of an exemplary insert and separation material.

FIG. 6 shows a plan top view of an exemplary insert 240 and a separation material 258. The exemplary insert 240 is optionally suitable for use with the examples of FIG. 2, FIG. 3, FIG. 4 and/or FIG. 5. The insert 240 includes a substantially arc section wall 244 and an opening 248 in the base portion 242 and an end relief 245 (optionally capable of forming an opening with another component) that spans about 90° with respect to a focus of the wall 244. In this example and/or other examples, an opening may exist in the wall 244 in lieu of, or in addition to, the end relief 245. The center of the opening 248 is noted by a dashed crosshair while the center or focus of the wall 244 is noted by a solid crosshair, which is displaced from the crosshair of the opening 248 by a distance $\Delta r_a$. FIG. 6 also shows a dashed line that indicates a substantially tubular wall 216 or compressor wall positioned substantially between the opening 248 and the substantially arc section wall 244. In this example, the wall 216 includes two outlets 218, 218' for processed gas flow to a compressor (see, e.g., the shell 210 of FIG. 2). The substantially tubular wall 216 optionally includes a center substantially coincident with the center of the opening 248.

The wall 216 and the wall 244 meet at locations 246 and 246' (e.g., arc edges) to, in part, define the separation region 250 and the open region 254. In particular, the wall 216 and the wall 244 substantially define the cross-sectional shape of the open region 254 which is typically void of separation material. Separation material 258 is positioned in a substantially annular region radially outward from the wall 216 and the wall 244 (e.g., the arc portion of the wall 244). In the exemplary separator 205 of FIG. 2, the region 250 may accept such separation material.

The density or resistance of the separation material 258 may vary with respect to position. For example, a substantially annular separation material 258 capable of some degree of deformation is optionally positioned in a manner whereby separation material proximate to the lower portion of the wall 244 has a greater density and/or resistance to flow than separation material proximate to the upper region of the opening 248. In FIG. 6, a distance $\Delta r_1$ represents a radial thickness of the separation material 258 proximate to the upper region of the wall 216 and a distance $\Delta r_2$ represents a radial thickness of the separation material 258 proximate to the lower portion of the wall 244. The distance $\Delta r_1$ is greater than the distance $\Delta r_2$; thus, the separation material associated with $\Delta r_2$ may be denser and offer greater resistance to gas flow when compared to the separation material associated with $\Delta r_1$.

Two thick, dashed flow arrows represent intended flow paths for processed gas and two thick, solid arrows represent intended flow paths for various separated components. Thus, a stream of gas and components may enter an exemplary separator, pass through separation material (e.g., a bed or region packed with separation material) and then to an outlet that leads to a compressor. Various components separated from the stream may pass through the separation material and flow due to gravity to an outlet. Separation of various components from a gas and components stream may occur in part due to reduction in flow velocity in at least some regions of an exemplary separator. Separation of various components from a gas and components stream may occur due to mechanical separation processes.

Replacement of separation material may optionally occur according to a schedule, during maintenance, upon indications of reduced flow (i.e., increased resistance or fouling), etc. Service of the separation material may occur through an attachment mechanism for the shell (e.g., the mechanism 264 of FIG. 2, the mechanism 364 of FIG. 3, etc.). Separation material may include a catalyst, surface treatment (e.g., hydrophilic/hydrophobic ratio, etc.), resistance to temperature, etc. Separation material optionally includes metal, organic matter, inorganic matter, etc. Separation material optionally deforms. Separation material optionally includes a microstructure and/or a macrostructure. Separation material may be compatible with engine fuels and lubricants.

As described herein, various exemplary separators may include a shell that includes an outer wall, an opening for gas and components and an outlet for various separated components; a substantially tubular wall disposed at least partially in the shell that includes an inlet end, an outlet end and an opening in the wall; a substantially arc section wall disposed between the substantially tubular wall and the outer wall wherein arc edges of the substantially arc section wall meet the substantially tubular wall to thereby form an open region and a separation region; an opening between the separation region and the open region; a flow path from the inlet for gas and components, through the separation region and to the opening of the substantially tubular wall; a flow path from the inlet for gas and components, through the separation region and to the outlet for various separated components; and a flow path from the inlet end of the substantially tubular wall to the outlet end of the substantially tubular wall to an inlet of the compressor. Such an exemplary separator optionally includes the inlet for gas and components and the outlet for various separated components disposed on the outer wall at respective positions approximately 180° apart and optionally includes the opening of the substantially tubular wall disposed at a position between approximately 90° and approximately 180° from the inlet for gas and components. Separation may occur at least in part due to the flow path from the inlet for gas and components, through the separation region and to the opening of the substantially tubular wall including one or more increases in flow area to cause a decrease in flow velocity to thereby enhance separation of components from the gas.

Such an exemplary separator optionally includes an outer wall of the shell with a substantially tubular shape. A base plate optionally couples to the substantially arc section wall and optionally has a substantially annular, disc-shape.

An exemplary method optionally includes providing piston blow-by gas to a separator coupled to a compressor, passing the blow-by gas through separation material to separate various components from the blow-by gas and to an open space adjacent an opening disposed radially on a conduit coupled to an inlet of the compressor and draining the various separated components from the separator through use of gravity. An exemplary device or assembly may include a fluid drain as an outlet for such various separated components (see, e.g., outlet 226 and outlet 326).

Various exemplary separators act to remove entrained crankcase vapors (e.g., components such as oil, fuel oil, combustion products, etc.) by porting crankcase gas (e.g., blow-by gas) to a separator coupled to a compressor where by processed gas flows to the compressor. In general, an exemplary separator operates in a manner whereby processed gas does not contribute significantly to fouling of the compressor. Various exemplary separators are compatible with ported compressor shroud designs. For example, a port of a shrouded compressor may be in fluid communication with a gap between an exemplary separator and the compressor. Various exemplary separators reduce noise associated, for example, with operation of a compressor.

The invention claimed is:

1. A separator for separating components from a gas and component mixture and for coupling to a compressor, the separator comprising:
   a shell that comprises an outer wall, an opening for gas and components and an outlet for various separated components;
   a substantially tubular wall disposed at least partially in the shell that comprises an inlet end, an outlet end and an opening in the wall;
   an arc section wall disposed between the substantially tubular wall and the outer wall wherein arc edges of the arc section meet the substantially tubular wall to thereby form an open region and a separation region; and
   a passage between the separation region and the open region;
   wherein a flow path is created from the inlet for gas and components, through the separation region and to the opening of the substantially tubular wall; a flow path is created from the inlet for gas and components, through the separation region and to the outlet for various separated components; and a flow path is created from the inlet end of the substantially tubular wall to the outlet end of the substantially tubular wall to an inlet of the compressor.

2. The separator of claim 1 wherein the arc section wall and the shell define the passage in the arc section wall.

3. The separator of claim 1 wherein the passage comprises an opening in the arc section wall.

4. The separator of claim 1, wherein the inlet for gas and components and the outlet for various separated components are disposed on the outer wall at respective positions approximately 180° apart.

5. The separator of claim 2 wherein the opening of the substantially tubular wall is disposed at a position between approximately 90° and approximately 180° from the inlet for gas and components.

6. The separator of claim 1, further comprising separation material positioned in the separation region.

7. The separator of claim 1 wherein the gas and components comprises piston blow-by gas from an internal combustion engine.

8. The separator of claim 1 wherein the outlet for various separated components is positioned with respect to gravity.

9. The separator of claim 1 wherein the flow path from the inlet for gas and components, through the separation region and to the opening of the substantially tubular wall joins the flow path to the outlet end of the substantially tubular wall to an inlet of the compressor.

10. The separator of claim 1 wherein the flow path from the inlet for gas and components, through the separation region and to the opening of the substantially tubular wall increases in flow area to cause a decrease in flow velocity to thereby enhance separation of components from the gas.

11. The separator of claim 1 wherein the components comprises one or more components selected from a group consisting of lubricants and combustion products.

12. The separator of claim 1 wherein the inlet for gas and components couples to a crankcase of an internal combustion engine.

13. The separator of claim 1 further comprising a compressor housing coupled to at least the outer wall of the shell.

14. The separator of claim 1 further comprising a base plate coupled to the arc section wall that further couples to a compressor housing.

15. The separator of claim 14 wherein a gap exists between the base plate and the compressor housing proximate to an inlet to the compressor housing.

16. The separator of claim 15 wherein the gap provides a flow passage to the inlet to the compressor housing.

17. The separator of claim 14 wherein the base plate comprises a substantially annular, disc-shape.

18. The separator of claim 1 wherein the outer wall of the shell comprises a substantially tubular shape.

19. The separator of claim 1 wherein the arc section wall comprises an axis, wherein the substantially tubular wall comprises an axis and wherein the axis of the arc section wall is offset from the axis of the substantially tubular wall.

* * * * *